3,576,029
ALKYLTETRAMETHYLDISILOXANE
Loren A. Haluska, Midland, Mich., assignor to Dow
Corning Corporation, Midland, Mich.
No Drawing. Filed Aug. 15, 1968, Ser. No. 752,749
Int. Cl. C07f 7/08
U.S. Cl. 260—448.2                                     2 Claims

ABSTRACT OF THE DISCLOSURE

Alkyltetramethyldisiloxanes in which the alkyl group has from 12 to 45 carbon atoms are disclosed. The alkyltetramethyldisiloxanes are useful as evaporation accelerators.

---

This invention relates to alkyltetramethyldisiloxanes.

An object of the present invention is to provide a new class of alkyltetramethyldisiloxanes which are useful as evaporation accelerators.

The present invention relates to an alkyltetramethyldisiloxane of the formula $$(C_nH_{2n+1})\underset{\underset{\displaystyle (CH_3)_2}{|}}{Si}-O-\underset{\underset{\displaystyle (CH_3)_2}{|}}{Si}H$$

wherein $n$ is an integer of from 12 to 45 inclusive.

The alkyltetramethyldisiloxanes of the present invention can best be prepared by reacting an α-olefin with $H(CH_3)_2SiCl$ in the presence of a platinum catalyst, such as chloroplatinic acid. The resulting product has a formula $$(C_nH_{2n+1})\underset{\underset{\displaystyle (CH_3)_2}{|}}{Si}Cl$$

This alkyldimethylchlorosilane and $H(CH_3)_2SiCl$ are mixed and hydrolyzed. To insure the desired end-product, the $H(CH_3)_2SiCl$ is used in excess such as two moles of $H(CH_3)_2SiCl$ to one mole of the alkyldimethylchlorosilane. The reaction mixture is distilled after hydrolysis to recover the product having a formula $$(C_nH_{2n+1})\underset{\underset{\displaystyle (CH_3)_2}{|}}{Si}-O-\underset{\underset{\displaystyle (CH_3)_2}{|}}{Si}H$$

The α-olefin can be any alkene which has a carbon-carbon double bond at a terminal carbon atom and has 12 to 45 carbon atoms per molecule. The α-olefin can be either straight chained or branched and include, for example, α-dodecene, α-pentadecene, α-octadecene, α-nonadecene, $$CH_2=CH(CH_2)_{20}CH_3$$
$$CH_2=CH(CH_2)_7CH(CH_2CH_3)(CH_2)_8CH_3$$
$$CH_2=CH(CH_2)_{27}CH_3, \quad CH_2=CHC[(CH_2)_{10}CH_3]_2$$
$$CH_2=CH(CH_2)_3CH[(CH_2)_6CH_3]_2$$
$$CH_2=CH(CH_2)_{21}CH_3, \quad CH_2=CH(CH_2)_{42}CH_3$$
$$CH_2=CH(CH_2)_{17}CH_3$$
$$CH_2=CH(CH_2)_{12}CH(CH_3)(CH_2)_4C(CH_3)_2(CH_2)_7CH_3$$

and $$CH_2=CH(CH_2)_{19}CH_3$$

The alkyltetramethyldisiloxanes of the present invention can include, for example $$CH_3(CH_2)_{44}\underset{\underset{\displaystyle (CH_3)_2}{|}}{Si}-O-\underset{\underset{\displaystyle (CH_3)_2}{|}}{Si}H, \quad CH_3(CH_2)_{11}\underset{\underset{\displaystyle (CH_3)_2}{|}}{Si}-O-\underset{\underset{\displaystyle (CH_3)_2}{|}}{Si}H$$

$$CH_3(CH_2)_{12}\underset{\underset{\displaystyle (CH_3)_2}{|}}{Si}-O-\underset{\underset{\displaystyle (CH_3)_2}{|}}{Si}H, \quad CH_3(CH_2)_{19}\underset{\underset{\displaystyle (CH_3)_2}{|}}{Si}-O-\underset{\underset{\displaystyle (CH_3)_2}{|}}{Si}H$$

$$CH_3(CH_2)_{13}\underset{\underset{\displaystyle (CH_3)_2}{|}}{Si}-O-\underset{\underset{\displaystyle (CH_3)_2}{|}}{Si}H, \quad CH_3(CH_2)_6CH(CH_3)(CH_2)_9\underset{\underset{\displaystyle (CH_3)_2}{|}}{Si}-O-\underset{\underset{\displaystyle (CH_3)_2}{|}}{Si}H$$

$$CH_3(CH_2)_{15}\underset{\underset{\displaystyle (CH_3)_2}{|}}{Si}-O-\underset{\underset{\displaystyle (CH_3)_2}{|}}{Si}H, \quad CH_3(CH_2)_8CH(CH_2CH_3)(CH_2)_9\underset{\underset{\displaystyle (CH_3)_2}{|}}{Si}-O-\underset{\underset{\displaystyle (CH_3)_2}{|}}{Si}H$$

$$CH_3(CH_2)_{17}\underset{\underset{\displaystyle (CH_3)_2}{|}}{Si}-O-\underset{\underset{\displaystyle (CH_3)_2}{|}}{Si}H, \quad CH_3(CH_2)_{14}\underset{\underset{\displaystyle (CH_3)_2}{|}}{Si}-O-\underset{\underset{\displaystyle (CH_3)_2}{|}}{Si}H$$

$$CH_3(CH_2)_{22}\underset{\underset{\displaystyle (CH_3)_2}{|}}{Si}-O-\underset{\underset{\displaystyle (CH_3)_2}{|}}{Si}H, \text{ and } CH_3(CH_2)_{21}\underset{\underset{\displaystyle (CH_3)_2}{|}}{Si}-O-\underset{\underset{\displaystyle (CH_3)_2}{|}}{Si}H.$$

The alkyltetramethyldisiloxanes of the present invention are particularly useful as evaporation accelerators. The alkyltetramethyldisiloxanes are applied to the surface of an aqueous body which is exposed to a gaseous atmosphere. The amount of alkyltetramethyldisiloxane applied is determined by the desired results and the temperature and movement of the gaseous atmosphere or aqueous body as well as the particular nature of both the gaseous atmosphere and the aqueous body. The alkyltetramethyldisiloxane can be used to increase the evaporation rate to cause increased cooling or it can be used to dry an aqueous body quicker.

Unwanted stagnant aqueous bodies, such as ponds or swamps, can be dried quicker and therefore the land can be put to work sooner.

The alkyltetramethyldisiloxanes can be applied to the aqueous body as is or in the form of an organic solution or by any other means suitable to disperse the compound over the aqueous surface.

The following examples are illustrative only and should not be construed as limiting the invention which is properly delineated in the appended claims.

EXAMPLE 1

(A) A mixture of octadecene-1, $H(CH_3)_2SiCl$ and chloroplatinic acid was heated in a high pressure bomb. The resulting mixture was distilled and a product collected which was octadecyldimethylchlorosilane.

A mixture of 1136 g. of $H(CH_3)_2SiCl$ and 2070 g. of the octadecyldimethylchlorosilane was hydrolyzed. The hydrolyzed product was washed until neutral with a mixture of water and sodium bicarbonate. The resulting mixture was distilled and 1457.2 g. of $$CH_3(CH_2)_{17}\underset{\underset{\displaystyle CH_3}{|}}{\overset{\overset{\displaystyle CH_3}{|}}{Si}}-O-\underset{\underset{\displaystyle CH_3}{|}}{\overset{\overset{\displaystyle CH_3}{|}}{Si}}H$$

was recovered.

(B) A ten weight percent solution of $$CH_3(CH_2)_{17}\underset{\underset{\displaystyle (CH_3)_2}{|}}{Si}-O-\underset{\underset{\displaystyle (CH_3)_2}{|}}{Si}H$$

in diethyl ether was prepared. Ten drops of the ether solution were placed on the surface of 100 g. of tap water in a 250 ml. stainless steel cup. The resulting assembly was placed in a controlled atmosphere of 65% relative humidity and 68° F. The weight of the cup, water and ether solution was initially made and then observed at time intervals of 1 day, 2 days, 5 days and 7 days. A control was also placed in the controlled atmosphere. The control was prepared as above, but without any siloxane solution. A solution was prepared as described above except $$C_{18}H_{37}\underset{\underset{\displaystyle (CH_3)_2}{|}}{Si}-O-\underset{\underset{\displaystyle (CH_3)_2}{|}}{Si}OH$$

was used in place of $$C_{18}H_{37}\underset{\underset{\displaystyle (CH_3)_2}{|}}{Si}-O-\underset{\underset{\displaystyle (CH_3)_2}{|}}{Si}H$$

This particular solution was used as a comparison to show the unique properties of the alkyltetramethyldisiloxanes of the present invention.

The results below are the weight percentages of water lost in a given period of time under the test conditions.

| Compound | Percent water loss after— | | | | Percent increase over control |
|---|---|---|---|---|---|
| | 1 day | 2 days | 5 days | 7 days | |
| 1. Control | 7.3 | 14.7 | 35.0 | 47.2 | |
| 2. $\begin{array}{c}CH_3\ \ \ \ CH_3\\ \|\ \ \ \ \ \ \ \ \ \|\\ C_{18}H_{37}Si-O-SiH\\ \|\ \ \ \ \ \ \ \ \ \|\\ CH_3\ \ \ \ CH_3\end{array}$ | 8.9 | 17.3 | 44.9 | 65.1 | 37.9 |
| 3. $\begin{array}{c}CH_3\ \ \ \ CH_3\\ \|\ \ \ \ \ \ \ \ \ \|\\ C_{18}H_{37}Si-O-SiOH\\ \|\ \ \ \ \ \ \ \ \ \|\\ CH_3\ \ \ \ CH_3\end{array}$ | 4.5 | 10.4 | 31.7 | 44.1 | −6.6 |

EXAMPLE 2

When the following olefins are reacted with $H(CH_3)_2SiCl$ and the product is hydrolyzed with $H(CH_3)_2SiCl$ in a ratio of 2 to 1 by the process described in Example 1, the products as shown in the following table are obtained.

| Olefin | Product |
|---|---|
| $CH_2=CH(CH_2)_9CH_3$ | $CH_3(CH_2)_{11}\underset{\underset{}{}}{\overset{(CH_3)_2}{Si}}-O-\underset{\underset{}{}}{\overset{(CH_3)_2}{Si}}H$ |
| $CH_2=CH(CH_2)_{14}CH_3$ | $CH_3(CH_2)_{16}\underset{}{\overset{(CH_3)_2}{Si}}-O-\underset{}{\overset{(CH_3)_2}{Si}}H$ |
| $CH_2=CH(CH_2)_{42}CH_3$ | $CH_3(CH_2)_{44}\underset{}{\overset{(CH_3)_2}{Si}}-O-\underset{}{\overset{(CH_3)_2}{Si}}H$ |
| $CH_2=CH(CH_2)_8CH(CH_3)(CH_2)_{11}CH_3$ | $CH_3(CH_2)_{11}\overset{CH_3}{\underset{}{C}}H(CH_2)_{10}\underset{}{\overset{(CH_3)_2}{Si}}-O-\underset{}{\overset{(CH_3)_2}{Si}}H$ |
| $CH_2=CH(CH_2)_3CH[(CH_2)_6CH_3]_2$ | $CH_3(CH_2)_6\overset{(CH_2)_6CH_3}{\underset{}{C}}H(CH_2)_5-\underset{}{\overset{(CH_3)_2}{Si}}-O-\underset{}{\overset{(CH_3)_2}{Si}}H$ |
| $CH_2=CH(CH_2)_{27}CH_3$ | $CH_3(CH_2)_{29}\underset{}{\overset{(CH_3)_2}{Si}}-O-\underset{}{\overset{(CH_3)_2}{Si}}H$ |

That which is claimed is:
1. An alkyltetramethyldisiloxane of the formula $$(C_nH_{2n+1})\underset{\underset{}{}}{\overset{(CH_3)_2}{Si}}-O-\underset{\underset{}{}}{\overset{(CH_3)_2}{Si}}H$$

wherein $n$ is an integer of from 12 to 45 inclusive.

2. The alkyltetramethyldisiloxane in accordance with claim 1, in which $n$ is 18.

References Cited

UNITED STATES PATENTS

| | | | |
|---|---|---|---|
| 2,491,843 | 12/1949 | Wilcock | 260—448.2(H) |
| 2,519,881 | 8/1950 | Brewer | 260—448.2(H) |

JAMES E. POER, Primary Examiner

P. F. SHAVER, Assistant Examiner

U.S. Cl. X.R.

260—448.2R